United States Patent
Solanki et al.

(10) Patent No.: US 12,353,681 B2
(45) Date of Patent: Jul. 8, 2025

(54) METHOD, SYSTEM AND COMPUTER PROGRAM PRODUCT FOR USER INTERFACE CUSTOMIZATION

(71) Applicant: Rakuten Mobile, Inc., Tokyo (JP)

(72) Inventors: Kuldeep Solanki, Madhya Pradesh (IN); Pankaj Mukati, Madhya Pradesh (IN); Satyam Shrivastav, Madhya Pradesh (IN); Ankush Tiwari, Madhya Pradesh (IN)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/904,785

(22) PCT Filed: Jul. 5, 2022

(86) PCT No.: PCT/US2022/036135
§ 371 (c)(1),
(2) Date: Aug. 23, 2022

(87) PCT Pub. No.: WO2024/010570
PCT Pub. Date: Jan. 11, 2024

(65) Prior Publication Data
US 2024/0256103 A1    Aug. 1, 2024

(51) Int. Cl.
*G06F 3/0483* (2013.01)
*G06F 9/451* (2018.01)
*G06F 21/62* (2013.01)

(52) U.S. Cl.
CPC ............ *G06F 3/0483* (2013.01); *G06F 9/451* (2018.02); *G06F 21/629* (2013.01)

(58) Field of Classification Search
CPC .... G06F 3/0481; G06F 3/0483; G06F 3/0482; G06F 3/0484; G06F 3/04842; G06F 21/629; G06F 9/451
USPC .................................................. 715/700–866
See application file for complete search history.

(56) References Cited

U.S. PATENT DOCUMENTS

| | | | |
|---|---|---|---|
| 8,341,519 B1* | 12/2012 | Warr ...................... | G06F 16/95 715/764 |
| 9,465,529 B1* | 10/2016 | Krivopaltsev ...... | G06F 3/04842 |
| 2003/0126160 A1* | 7/2003 | Engelhardt-Cronk ...................... G06F 16/217 | |
| 2006/0206834 A1* | 9/2006 | Fisher .................. | G06F 3/0484 715/777 |

(Continued)

*Primary Examiner* — Daniel Samwel
(74) *Attorney, Agent, or Firm* — HAUPTMAN HAM, LLP

(57) ABSTRACT

A system for user interface customization includes at least one processor, and at least one computer readable storage medium coupled to the at least one processor and configured to store executable instructions. The executable instructions, when executed by the at least one processor, cause the at least one processor to visually present a first input area for receiving user input of a view associated with a page of a user interface, visually present a second input area for receiving user input of user permission associated with the page of the user interface, store view information corresponding to the view and permission information corresponding to the user permission in association with the user interface, based on the view information, render the view on the page of the user interface, and based on the permission information, control whether the page is to be visually presented in the user interface.

18 Claims, 10 Drawing Sheets

(56) References Cited

U.S. PATENT DOCUMENTS

| | | | |
|---|---|---|---|
| 2007/0143662 A1* | 6/2007 | Carlson | G06F 9/451 |
| | | | 715/234 |
| 2009/0217200 A1* | 8/2009 | Hammack | G05B 19/0426 |
| | | | 715/810 |
| 2011/0271217 A1* | 11/2011 | Cruz Moreno | G06F 3/0482 |
| | | | 715/765 |
| 2013/0212487 A1 | 8/2013 | Cote | |
| 2016/0094681 A1* | 3/2016 | Wu | H04L 67/02 |
| | | | 709/203 |
| 2016/0357363 A1* | 12/2016 | Decker | G06F 3/165 |
| 2018/0335921 A1 | 11/2018 | Karunamuni et al. | |
| 2020/0106904 A1* | 4/2020 | Ogura | H04N 1/00432 |
| 2020/0342089 A1* | 10/2020 | Mummadi | G06F 3/04817 |
| 2021/0250414 A1* | 8/2021 | Arribalzaga | H04L 67/55 |
| 2022/0222461 A1* | 7/2022 | Mann | H04L 63/105 |

\* cited by examiner

FIG. 2D

| Site ID | Page Name or Tab Name | Page Type or Tab Type | View Name or View ID | User Permission | ... |
|---|---|---|---|---|---|
| 0001 | Overview | System | | | |
| 0001 | Workorder | System | | | |
| 0001 | ... | ... | ... | ... | ... |
| 0001 | Custom 1 | Custom | View 1 | Default User, User 1, User 2 | |
| 0001 | Custom 2 | Custom | View 2 | Default User | |
| 0002 | Overview | System | | | |
| 0002 | Workorder | System | | | |
| 0002 | ... | ... | ... | ... | ... |
| 0002 | Custom 3 | Custom | View 3 | Default User, User 3 | |
| ... | ... | ... | ... | ... | ... |

FIG. 3

METHOD, SYSTEM AND COMPUTER PROGRAM PRODUCT FOR USER INTERFACE CUSTOMIZATION

RELATED APPLICATIONS

The present application is a National Phase of International Application No. PCT/US2022/036135, filed Jul. 5, 2022.

TECHNICAL FIELD

The instant application is related to user interface (UI) configuration.

BACKGROUND

User interfaces are configured to facilitate interactions between humans and machines, e.g., between humans and computer systems. Considerations are given to user interface configurations that are intuitive, user-friendly, efficient, or the like.

SUMMARY

In some embodiments, a system for user interface customization comprises at least one processor, and at least one memory coupled to the at least one processor and configured to store executable instructions. The executable instructions, when executed by the at least one processor, cause the at least one processor to visually present a first input area for receiving user input of a view associated with a page of a user interface, visually present a second input area for receiving user input of user permission associated with the page of the user interface, store view information corresponding to the view and permission information corresponding to the user permission in association with the user interface, based on the view information, render the view on the page of the user interface, and based on the permission information, control whether the page is to be visually presented in the user interface.

In some embodiments, a method of user interface customization is performed at least in part by at least one processor. The method comprises adding or modifying a custom tab in a user interface. In the adding or modifying the custom tab, first, second and third input areas are visually presented for receiving user input correspondingly of a view associated with the custom tab, user permission associated with the custom tab, and a name of the custom tab. A view configuration corresponding to the view is fetched from at least one database. Based on the fetched view configuration, one or more resources corresponding one or more fields in the view are determined. Data of the one or more fields are fetched from the corresponding one or more resources. The view is rendered to include the one or more fields and the fetched data of the one or more field. The custom tab with the rendered view is visually presented in the user interface.

In some embodiments, a computer program product comprises a non-transitory, tangible computer readable storage medium storing a computer program that, when executed by at least one processor, causes the at least one processor to, upon initialization of or access to a user interface including a custom tab and one or more system tabs, the custom tab associated with a view and user permission, determine whether user information of a current user of the user interface matches permission information corresponding to the user permission associated with the custom tab. In response to the user information of the current user of the user interface matching the permission information, the at least one processor is caused to visually present, in the user interface, names of the custom tab and the one or more system tabs, fetch data of one or more fields of the view from one or more resources, render the view to include the one or more fields and the fetched data, and visually present the custom tab with the rendered view in the user interface upon user selection of the name of the custom tab. In response to the user information of the current user of the user interface not matching the permission information, the at least one processor is caused to visually present, in the user interface, the names of the one or more system tabs, without visually presenting the name of the custom tab.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

FIGS. 2A-2D are schematic diagrams showing various screens of a user interface having user interface customizability, in accordance with some embodiments.

FIG. 3 is a schematic diagram of a portion of a database for storing tab information, in accordance with some embodiments.

DETAILED DESCRIPTION

Figure 1:
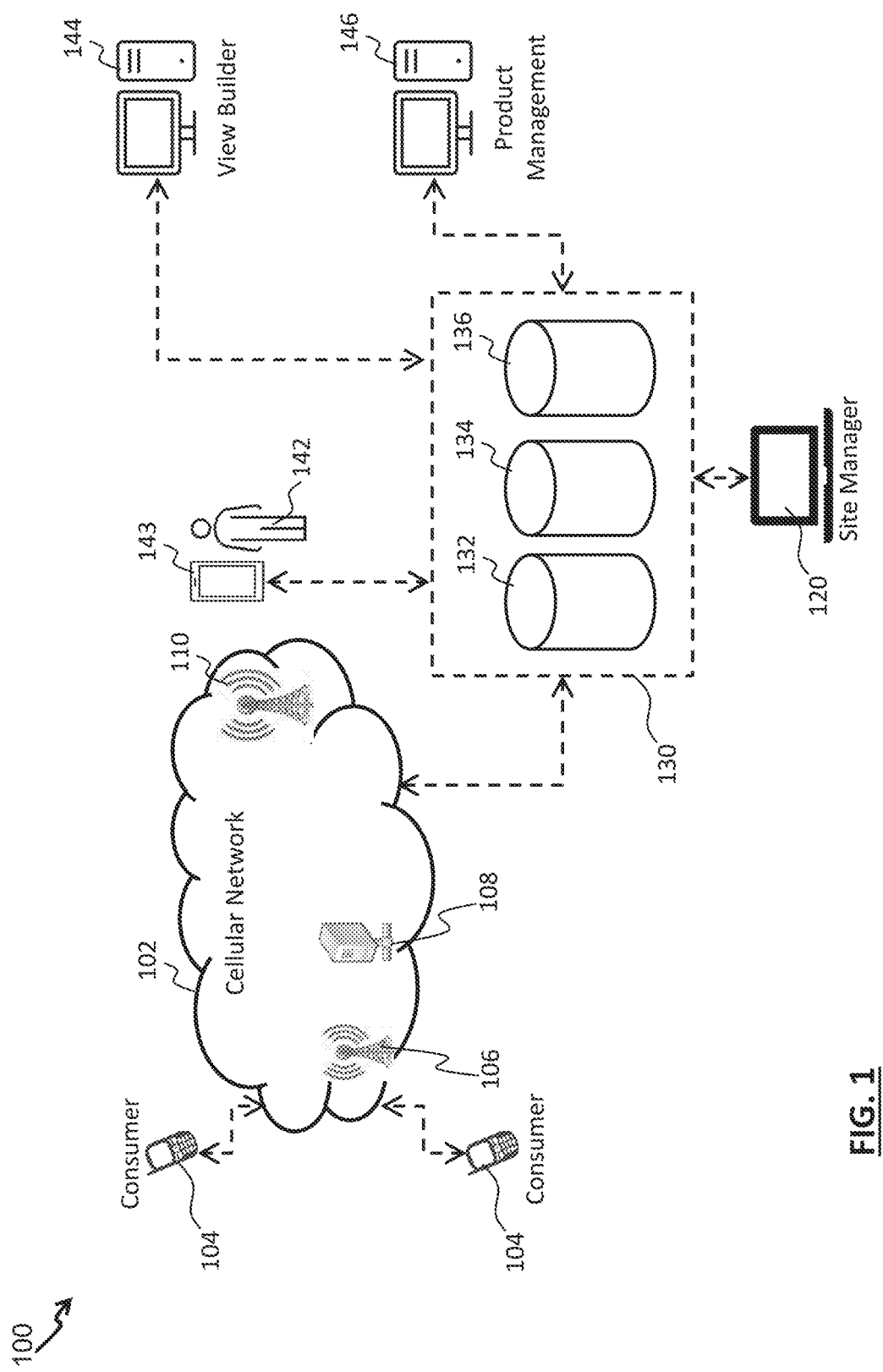
FIG. 1 is a schematic diagram of a system in which user interface customization in accordance with some embodiments is applicable.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In some embodiments, user interfaces are provided by computer systems to facilitate interactions between humans and the computer systems. A purpose of a user interface is to present information of a computer system to a user, and/or to receive information from the user to be input into the computer system. As information is presented by the user interface to the user, there are concerns that the information is not presented in a manner preferred by the user, and/or the user prefers a different set of information, and/or the information is presented to a unauthorized user, or the like. In some embodiments, such concerns are addressed by providing a user with capabilities to customize a user interface, e.g., to create, modify, hide, or delete a custom tab or page.

In at least one embodiment, a user interface is configured to provide a user with a screen where the user creates or modifies a custom tab by entering or modifying a name of the custom tab, a view associated with the custom tab, and user permission associated with the custom tab. The view is rendered by fetching data from one or more resources corresponding to the view. The custom tab including the rendered view with the fetched data is included in the user interface, and presented to the user who just created or modified the custom tab. Subsequently, when the user interface is initialized or accessed by a current user, user information of the current user is checked against the user permission associated with the custom tab. When the user information of the current user matched the user permission, the custom tab is made available to be presented to the current user. Otherwise, the custom tab is made unavailable to be presented to the current user, e.g., by hiding the custom tab from being presented in the user interface.

The user interface customizability in accordance with some embodiments provides one or more advantages over other approaches. In other approaches without user interface customizability, whenever a user interface is to be changed to meet a certain requirement, it is necessary for the user to go back to the developer of the user interface and request the developer to implement the required change. If the user interface is required to be repeatedly modified, e.g., due to frequent or dynamic changes in requirements for the data to be presented, it is necessary for the user to repeatedly request, and for the developer to repeatedly perform, user interface modifications. This process unnecessarily takes time, cost and/or development efforts. In at least one embodiment, with the user interface customizability described herein, a user may create and then modify a custom tab or page as desired, without having to go back to the developer. Further, in one or more embodiments, the user permission associated with the custom tab ensures that only authorized users matching the user permission may see the custom tab and access to data presented in the custom tab, whereas unauthorized users are not able to see the custom tab and therefore are prevented from accessing the data presented in the custom tab. This data security feature is lacking in one or more other approaches that do not provide user interface customizability. Further features and/or advantages are within the scopes of various embodiments.

FIG. 1 is a schematic diagram of a system 100 in which user interface customization in accordance with some embodiments is applicable. In the example configuration in FIG. 1, user interface customization in accordance with some embodiments is applied for managing sites in a cellular network 102. This is only an example application of user interface customization in accordance with some embodiments. Other fields, industries, applications, services, etc., in which user interface customization as described herein is usable, are within the scopes of various embodiments.

In the cellular network example in FIG. 1, consumers' mobile terminals 104 are coupled to the cellular network 102 to receive communication services. In an example, the cellular network 102 comprises a plurality of cells (not shown) in which cellular services are provided, through corresponding base stations. Representative base stations 106, 110 are illustrated in FIG. 1. The base stations constitute a radio access network, and are coupled to a core network of the cellular network 102. A representative network device 108 of the core network is illustrated in FIG. 1. Examples of the cellular network 102 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like. Example configurations of the base stations include cell towers each having one or more cellular antennas, one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Examples of mobile terminals 104, include, but are not limited to, cell phones, tablets, media players, gaming consoles, personal data assistants (PDAs), laptops, and other electronic devices configured to transmit and/or receive cellular communication to/from the base stations of the cellular network 102. An example hardware configuration of a mobile terminal and/or a base station includes a computer system described with respect to FIG. 7, with the addition of one or more cellular antennas and corresponding cellular transceiving circuitry. Examples of communication technologies for performing cellular communications between base stations and mobile terminals include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals. Example components (or network devices 108) of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations by one or more public and/or proprietary networks. An example hardware configuration of a component or network device 108 of the core network includes a computer system described with respect to FIG. 7.

The system 100 comprises a site manager 120 for managing a plurality of sites in the cellular network 102. Base stations and network devices are examples of sites to be managed by the site manager 120. Other types of sites manageable by the site manager 120 are within the scopes of various embodiments. The site manager 120 is configured to provide one or more user interfaces to present information regarding various sites of the cellular network 102 to users of the site manager 120. The site manager 120 is further configured to permit one or more of the users of the site manager 120 to customize one or more of the user interfaces, i.e., to provide users of the site manager 120 with user interface customizability as described herein. Although in one or more embodiments specifically described herein, information regarding sites in the cellular network 102 is described as being presented through customizable user interfaces, further embodiments encompass other situations, fields, industries, applications, services, etc., where information regarding other objects is presentable through customizable user interfaces. In some embodiments, the site manager 120 comprises software executed on/by hardware. An example hardware configuration for implementing the site manager 120 includes a computer system described with respect to FIG. 7. For example, the site manager 120 includes executable instructions stored in at least one memory and executed by at least one processor. Other software and/or hardware configurations are within the scopes of various embodiments.

The system 100 further comprises one or more databases 130 which are coupled to the site manager 120, e.g., by a network, and are configured to store information regarding various operations, functions, components, etc., of the cellular network 102. In some embodiments, the one or more databases 130 are implemented by one or more non-transitory computer-readable media in one or more computer systems, as described with respect to FIG. 7. In the example configuration in FIG. 1, the one or more databases 130 include databases 132, 134, 136. The database 132 is configured to at least store data to be presented through user interfaces of the site manager 120 to users. The database 134 is configured to at least store view configurations of various views in accordance with which the data fetched from the database 132 are presented in the user interfaces of the site manager 120. The database 136 is configured to store managing information for managing various users, operations, functions, components, etc., of the cellular network 102. In an example, data in the database 132 are collected by one or more field technicians or engineers 142 using respective mobile equipment 143, and/or provided from the cellular network 102. In a further example, view configurations in the database 134 are created, modified, and stored therein by a view builder 144. In another example, managing information in the database 136 is created, modified, and stored therein by a product management 146. In at least one embodiment, the managing information in the database 136 includes user information for implementing data security (or custom tab visibility) in accordance with user permission associated with custom tabs, as described herein. In some embodiments, each of the view builder 144 and product management 146 comprises software executed on/by hardware. An example hardware configuration for executing the view builder 144 and/or the product management 146 includes a computer system described with respect to FIG. 7. For example, the view builder 144 or the product management 146 includes executable instructions stored in at least one memory and executed by at least one processor. In at least one embodiment, the view builder 144 is developed in Angular which is a platform for building mobile and/or desktop web applications. Other platforms and/or software configurations are within the scopes of various embodiments. The described configurations of the one or more databases 130 and their relationships with the site manager 120, view builder 144 and/or product management 146 are examples. Other configurations and/or relationships are possible. For example, another number of databases and/or other types of data and/or information stored in each database are within the scopes of various embodiments. In at least one embodiment, each of the one or more databases 130, view builder 144, product management 146 is implemented by one or more computer systems. In at least one embodiment, two or more of the site manager 120, one or more databases 130, view builder 144, product management 146 are implemented by the same computer system. For example, the view builder 144 and/or product management 146 is/are implemented in the same computer system as the site manager 120 in one or more embodiments.

In some embodiments, the view builder 144 is configured to create, modify, or delete views automatically and/or in accordance with user input. In an example, a view comprises at least one field or key. The quantity of fields in a view is not limited to any particular number. In at least one embodiment, a field of a view corresponds to a field or key of a resource, and data of such field of the view are fetched directly from the corresponding resource. In at least one embodiment, a field of a view includes data combined, e.g., calculated or logically determined, from data of multiple fields of one or more resources. In some embodiments, various fields of the view come from different resources. Example resources include relations and/or tables stored in at least one database among the one or more databases 130. The quantity of tables in a database is not limited to any particular number. It is possible that fields of a view come from various tables and/or databases. In at least one embodiment, a view is described by a file referred to as a view configuration. The view configuration comprises information regarding fields in the view and corresponding resources of the fields. In an example, a view configuration is a JavaScript Object Notation (JSON) configuration. Other table configurations, database configurations, resource configurations, and/or view configurations are within the scopes of various embodiments. One or more specific example views are described with respect to one or more of FIGS. 2A-2D.

A view is usable to present and/or collect data. In an example, a view is usable in a user interface at the site manager 120 to present data to a user, e.g., a manager or an admin. In a further example a view is usable at the mobile equipment 143 of a field technician or engineer 142 as a form to be filled in by the field technician or engineer 142 and/or mobile equipment 143 of the field technician or engineer 142. In another example, a view is usable at the site manager 120 and/or the mobile equipment 143 for both data entry and data presentation. In the example configuration in FIG. 1, a view is used at the mobile equipment 143 of the field technician or engineer 142 who enters data into corresponding fields in the view while performing one or more tasks related to the cellular network 102, e.g., for surveying, installing, servicing or checking operations of the base station 110. The data entered by the field technician or engineer 142 are stored in the one or more databases 130 and are presented to an admin via the same or a different view in a user interface at the site manager 120. This is only an example application of views. Other fields, industries, applications, services, etc., in which views are usable are within the scopes of various embodiments.

FIGS. 2A-2D are schematic diagrams showing various screens of a user interface 200 having user interface customizability, in accordance with some embodiments.

In some embodiments, a user interface (UI) is a graphical user interface (GUI) provided by at least one processor executing computer-executable instructions, or computer code. Operations or functionality of a user interface described herein are implemented by the at least one processor. In one or more embodiments, a user interface comprises a combination of a GUI with another type of user interface, such as a tactile UI and/or an auditory UI. Other UI configurations are within the scopes of various embodiments. In a GUI, information is visually presented to a user. An example of visual presentation of a view, field, GUI, parameter, value, item or the like, includes displaying the view, field, GUI, parameter, value, item or the like, on a display, such as a monitor or a touch screen. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying" or "displayed" is used in the following description as an example manner for visual presentation of information. Other manners for visual presentation, as discussed herein, are not excluded. A user may interact with displayed, or otherwise visually presented, information by a pointing device (e.g., a mouse), a touch screen, contactless gestures, or the like.

Figure 2A:
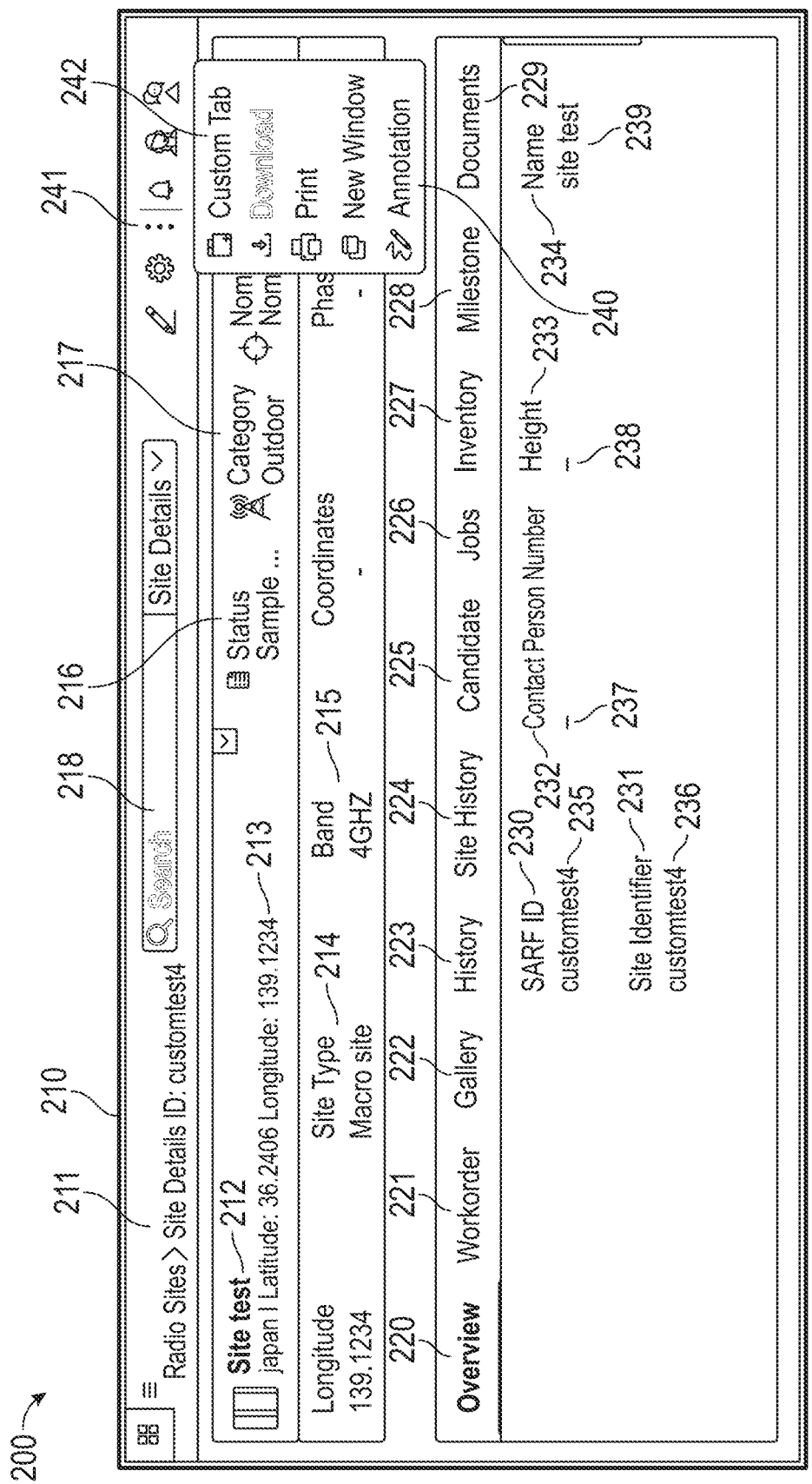

In FIG. 2A, the user interface 200 includes a screen 210 and is configured to present information regarding a particular site among a plurality of sites in the cellular network 102. A site identification (ID) 211 (e.g., "customtest4") and a site name 212 (e.g., "site test") of the site are included in the screen 210. The screen 210 further comprises other details of the site, such as a site location 213 (longitude and latitude), a site type 214 (e.g., "Macro site"), a band 215 (e.g., "4 Ghz"), a status 216 (e.g., "Sample"), a category 217 (e.g., "Outdoor") of the site. In some embodiments, one or more of the described details is/are omitted and/or other details are included in the screen 210. In an example, the user interface 200 associated with the particular site is initialized or accessed when a user selects the site name (e.g., "site test") or site ID (e.g., "customtest4") from a list of sites in another screen (not shown). In a further example, the user interface 200 associated with the particular site is initialized or accessed when the site name or site ID is returned from a search, for example, performed using a search area 218.

The user interface 200 comprises a plurality of pages 220-229 which are arranged in the form of various tabs. Page names or tab names, i.e., "Overview," "Workorder," . . . "Documents," of the pages or tabs 220-229 are displayed in the screen 210. Contents of a selected tab (or a default tab when the user interface 200 is initialized or accessed) are also displayed in the screen 210. In the example configuration in FIG. 2A, the tab 220 with the tab name "Overview" is selected, and contents of the tab 220 are displayed. The contents of the tab 220 serve as an example of a view associated with the tab 220. The view includes a plurality of fields or keys 230-234 and corresponding data. Each of the fields 230-234 corresponds to one or more resources (e.g., one or more tables), and data of each of the fields 230-234 are fetched, when available, from the corresponding resource(s). The fetched data are displayed in the screen 210. For example, data 235, 236, 239 of the fields 230, 231, 234 are available on and fetched from the corresponding resource(s) and then displayed in the screen 210, whereas data of the fields 232, 233 are not available at the corresponding resource(s) and are presented by blank or empty spaces 237, 238. Other tabs 221-229 are associated with other views and include different fields. In an example, the tabs 220-229 include information that most or all users at the site manager 120 require. In some embodiments, the tabs 220-229 are system tabs which are neither modifiable, hidable, nor deletable. Such system tabs are different from custom tabs which are modifiable, hidable, and deletable, as described herein with respect to one or more embodiments. The described arrangement of pages of the user interface 200 as tabs is an example. Other page arrangements in a user interface are within the scopes of various embodiments. For example, multiple pages of the user interface 200 may be displayed as multiple windows arranged side-by-side or in an overlapping manner. For simplicity, the tab arrangement is used in one or more embodiments specifically described herein.

In the example configuration in FIG. 2A, the user interface 200 further comprises a drop-down menu 240. When the user interface 200 is initialized or initially accessed, the screen 210 is displayed without the drop-down menu 240. Upon user operation, e.g., mouse click or touch, on a control item 241 of the screen 210, the drop-down menu 240 is displayed. The drop-down menu 240 comprises various control items, among which a control item 242 is for creating a custom tab. Upon user operation on the control item 242, the user interface 200 causes a screen or panel or window 250 to be displayed over the screen 210, as described with respect to FIG. 2B.

Figure 2B:
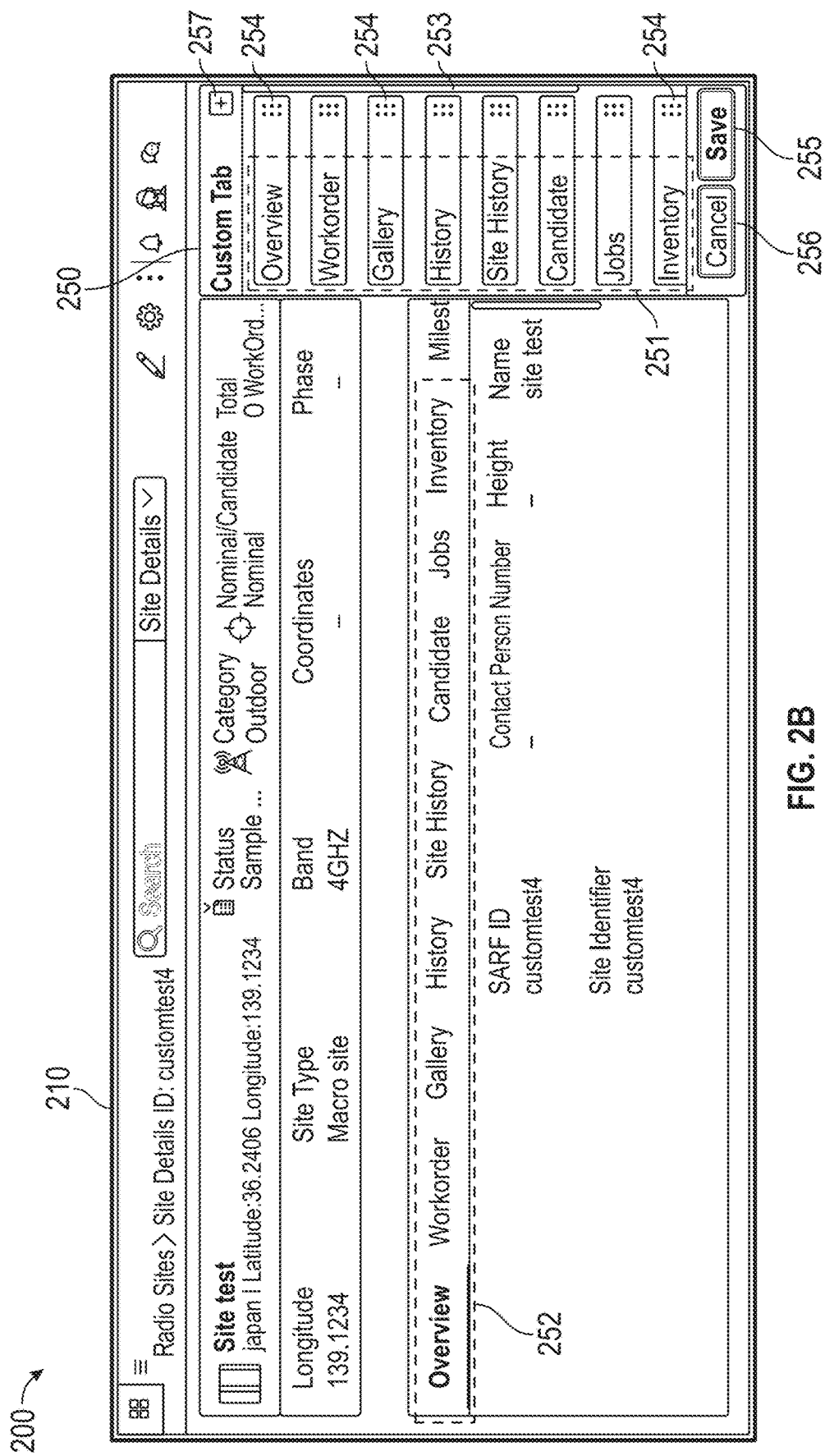

In FIG. 2B, the screen 250 comprises a list 251 of tabs already included in the user interface 200. For example, the list 251 includes tab names, e.g., "Overview," "Workorder," . . . "Inventory," of the tabs 220-227 described with respect to FIG. 2A. The initial order of the tabs in the list 251 is the same as the order 252 of the tabs in the screen 210. Tab names of other tabs, e.g., 228, 229, are displayed in the list 251 upon user operation on a scroll bar 253, or by a scrolling operation or gesture. Each of the tab name in the list 251 has a corresponding control item 254. When the user moves, e.g., by a dragging operation, the control item 254 corresponding to a tab name up or down the list 251, the order of the tab names in the list 251 is changed. This changed order is stored and reflected in the order 252 of the tabs in the screen 210 upon user selection of a Save button 255. User selection of a Cancel button 256 will cancel unsaved modifications. The screen 250 also comprises a control item 257 for adding a new custom tab. Upon user operation on the control item 257, the user interface 200 causes a screen or panel or window 260 to be displayed, as described with respect to FIG. 2C.

Figure 2C:
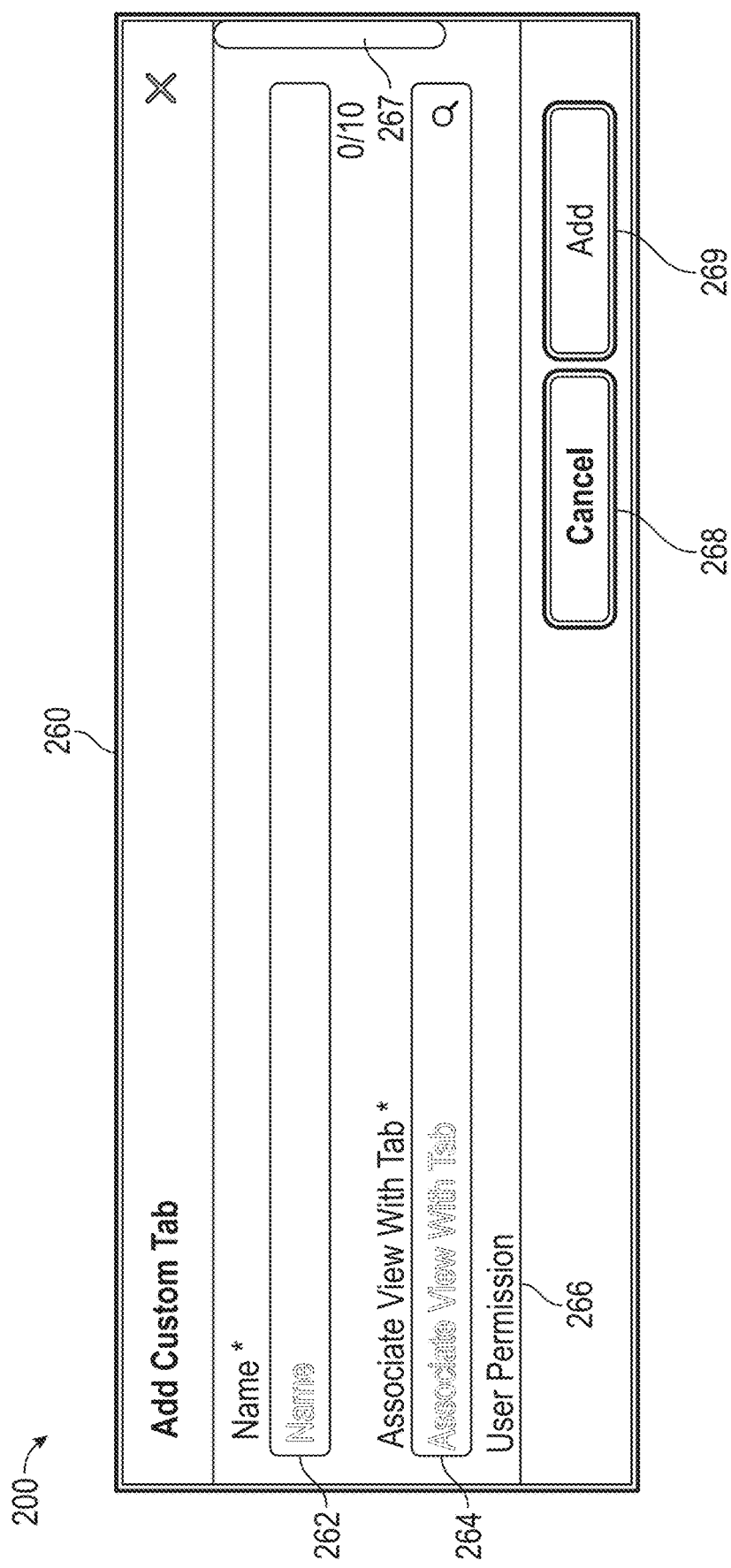

Although not illustrated in FIG. 2B, any custom tab that has already been added to the user interface 200 is also included in the list 251, and may be moved up or down the list 251 to be correspondingly rearranged in the tab order 252 in the screen 210. For example, a custom tab may be moved to the top of the list 251 so that, in the screen 210, such custom tab will be arranged at the leftmost position in the tab order 252. Further, a custom tab already included in the user interface 200 and displayed in the list 251 may be modified, e.g., by one or more user operations on the tab name of the custom tab in the list 251. As a result of such one or more user operations, a screen similar to the screen 260 in FIG. 2C is displayed. In addition, a custom tab already included in the user interface 200 and displayed in the list 251 may be deleted, e.g., by one or more user operations on the tab name of the custom tab in the list 251. As a result, the custom tab is removed from the user interface 200 and will no longer be displayed in the screen 210 or the list 251.

In FIG. 2C, the screen 260 is displayed upon user operation to add a new custom tab or to modify an existing custom tab, as described with respect to FIG. 2B. In some embodiments, the screen 260 is displayed over the screen 210 in a manner similar to the screen 250. For simplicity, the screen 210 underlying the screen 260 is omitted in FIG. 2C. The user who creates or modifies a custom tab is referred to herein as the custom tab owner.

The screen 260 comprises a name input area 262, a view input area 264, and a user permission input area 266 for correspondingly receiving user input of a name of a custom tab to be added, a view associated with the custom tab, and user permission associated with the custom tab. The user permission input area 266 is not fully visible in FIG. 2C, but will be fully displayed when the screen 260 is scrolled down by a scroll bar 267, or by a corresponding scrolling operation or gesture. In one or more embodiments, when fully displayed, the user permission input area 266 is similar to the view input area 264.

The name input area 262 is configured to receive user input of a name of the custom tab to be added. For example, a character string is input by the custom tab owner as a name of the custom tab to be added. When the screen 260 is displayed to modify an existing custom tab, the name input area 262 includes the name of the existing custom tab and permits the custom tab owner to change the name.

The view input area 264 is configured to receive a view associated with the custom tab to be added. In some embodiments, the view input area 264 is configured as a drop-down menu which contains a list of views available for user selection. In some embodiments, the views in the listed are created by the view builder 144 and stored in the one or more databases 130. Upon user selection of a view from the list, a view name or view ID of the selected view is displayed in the view input area 264. The view name and view ID are examples of view information to be stored in association with the user interface 200, as described herein.

In some situations, there may be too many available views, e.g., several hundred or thousand views, to be practically included in a list of a drop-down menu. To address such situations, the view input area 264 is configured as a search area which permits the custom tab owner to enter a few characters of the view name or view ID of a desired view. A search is performed as characters are input by the custom tab owner and/or in response to the custom tab owner's command to search, e.g., by operating the Enter key of a keyboard. The search is performed in one or more databases containing views created and/or managed by the view builder 144. A single hit or a list of hits is returned from the search. The single hit, or a hit selected by the custom tab owner from the list of hits, is a view selected by the custom tab owner to be associated with the custom tab to be added. A view name or view ID of the selected view is displayed in the view input area 264.

When the screen 260 is displayed to modify an existing custom tab, the view input area 264 includes the view name or view ID of the existing associated view, and a new view is selected or searched for in a manner as described herein.

The user permission input area 266 is configured to receive user permission associated with the custom tab to be added. The user permission indicates one or more individual users or a group of users who are authorized to view or access the custom tab. The user permission is presented by permission information which includes, but is not limited to, user name, user ID, user group name, user group ID, user authorization level, or the like. In some embodiments, user name or user ID indicates an individual authorized user. User group name or user group ID indicates a group of users, e.g., a group of admins, who are authorized to access the custom tab. User authorization level is usable where multiple users are previously assigned different authorization levels, and indicates that users having authorization levels at or higher than the user authorization level defined for a custom tab may access the custom tab whereas users having authorization levels below the defined user authorization level may not access the custom tab.

In some embodiments, the custom tab owner selects the desired permission information from a list, or searches for the desired permission information in a manner similar to that described with respect to the view input area 264. Permission information to be selected or searched for is provided from one or more databases created and/or managed by the product management 146.

When the screen 260 is displayed to modify an existing custom tab, the user permission input area 266 includes the existing permission information, and new permission information is selected or searched for in a manner as described herein.

The user permission associated with a custom tab is given default permission information corresponding to the custom tab owner. The default permission information includes at least the custom tab owner, to ensure that even when the user permission input area 266 is left blank, the custom tab owner may later access, modify or delete the custom tab. In some embodiments, the default permission information includes the user name or user ID of only the custom tab owner, which means, by default, only the custom tab owner may access the custom tab. In some embodiments, the default permission information includes one or more other users in addition to the custom tab owner. In at least one embodiment, the default permission information includes a user group name or user group ID of a user group to which the custom tab owner belongs. As a result, all users in the user group are, by default, authorized to access the custom tab. In one or more embodiments, the default permission information includes the user authorization level of the custom tab owner. As result, all users having user authorization levels at or higher than the user authorization level of the custom tab owner are authorized to access the custom tab. In some embodiments, the default permission information is automatically displayed in the user permission input area 266 when a custom tab is created. The custom tab owner may modify or delete the default permission information, and/or add new permission information as desired.

When the custom tab owner selects a Cancel button 268, the process of adding a new custom tab or modifying an existing custom tab is aborted. When the custom tab owner selects an Add button 269, the input name, view and user permission of the custom tab are stored in association with the user interface 200. In some embodiments, before storing the input name, view and user permission of the custom tab, the user interface 200 displays a confirmation window or screen (not shown) asking the custom tab owner to confirm that the new or modified custom tab is to be stored, and the input name, view and user permission of the custom tab are stored upon confirmation by the custom tab owner. An example of how the input name, view and user permission of a custom tab are stored in association with the user interface 200 is described with respect to FIG. 3.

Figure 2D:
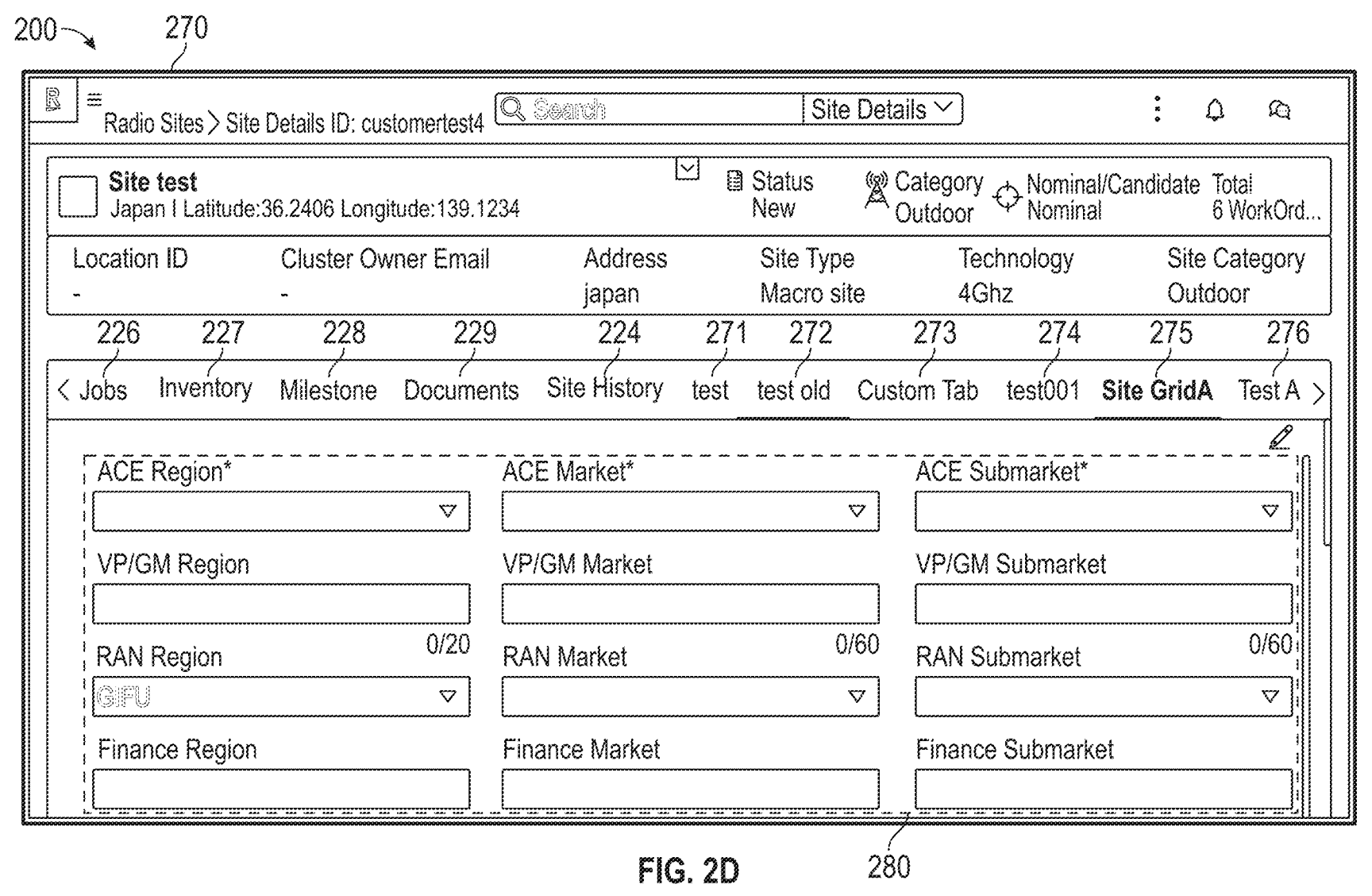

Upon storing the input name, view and user permission of a custom tab which has been just created or modified, the user interface 200 is configured to automatically render the view associated with the custom tab, and display the rendered view in a screen 270 as shown in FIG. 2D. An example of how a view is rendered is described with respect to FIG. 4.

In FIG. 2D, the screen 270 is similar to the screen 210, but includes custom tabs 271-276 in addition to the system tabs 226-229 and 224. The order of the system tabs and custom tabs in the screen 270 may be rearranged as described with respect to FIG. 2B. The custom tab 275 has just been created or modified, and is the selected tab in the screen 270. The contents of the custom tab 275 are displayed in the screen 270, and includes a rendered view 280. Similar to the view described with respect to FIG. 2A, the rendered view 280 includes a plurality of fields and any available data fetched from one or more resources corresponding to the fields. Unavailable data are displayed as blanks or empty spaces. The number of fields and the specific fields included in the rendered view 280 as well as one or more resources from which data corresponding to the fields are retrievable are defined in a view configuration of the view associated with the custom tab 275. By defining a different view in association with each of the custom tabs 271-276, the custom tab owner is able to customize the user interface 200 to display the data the custom tab owner needs in a manner and/or order the custom tab owner prefers. This user interface customizability, in at least one embodiment, greatly reduces time, cost, and/or development efforts related to user interface modifications, because users are given the ability to easily and conveniently change user interfaces themselves to meet a certain requirement, without having to go back to the developer of the user interface to request the required change.

A further advantage in accordance with some embodiments includes data security. For example, after the custom tab 275 has been created or modified, when the user interface 200 is subsequently initialized or accessed by a user (hereinafter referred to as the current user), the user interface 200 checks the permission information associated with the custom tab 275 to determine whether the custom tab 275 is to be displayed to or accessed by the current user. In at least one embodiment, the user interface 200 determines whether user information of the current user matches the permission information associated with the custom tab 275. In some embodiments, the user information of the current user includes a user name or user ID of the current user, a user group name or user group ID of a user group to which the current user belongs, or a user authorization level of the current user. The user information of the current user is considered to match the permission information associated with the custom tab when the user name or user ID of the current user, or the user group name or user group ID of the user group to which the current user belongs, is included in the permission information associated with the custom tab, or when the user authorization level of the current user is at or higher than a user authorization level defined in the permission information.

In response to the user information of the current user matching the permission information, the user interface 200 is configured to permit the custom tab 275 with the rendered view 280 to be visually presented in the user interface 200. The user interface 200 displays the name (i.e., "Site GridA") of the custom tab 275 together with the names of the system tabs. The visibility of the name of the custom tab 275 indicates that the custom tab 275 is accessible by the current user. In some embodiments, without user selection of the name of the custom tab 275, the custom tab 275 is not yet selected and contents of the custom tab 275 are not yet displayed in the user interface 200. The user interface 200 is configured to render the view associated with the custom tab 275 to generate the rendered view 280. Upon user selection of the name of the custom tab 275, the rendered view 280 is displayed. In some embodiments, regardless of whether the rendered view 280 is displayed or remains in the background, data in the rendered view 280 are updated in real time and/or periodically. In at least one embodiment, real time data update occurs in response to a change of data corresponding one or more of the fields of the rendered view 280, and periodical data update occurs at a predetermined interval.

In response to the user information of the current user not matching the permission information, the user interface 200 is configured to prevent the custom tab 275 from being visually presented in the user interface 200. In at least one embodiment, the name (i.e., "Site GridA") of the custom tab 275 is hidden or not displayed. Because the name of the custom tab 275 is not displayed, the current user may not be aware that the custom tab 275 exists and, therefore, unauthorized access to the custom tab 275 and data in the contents (i.e., the rendered view 280) of the custom tab 275 is prevented. In at least one embodiment, the name of the custom tab 275 is displayed; however, the contents, i.e., the rendered view 280, of the custom tab 275 are not displayed upon user selection of the name of the custom tab 275. Thus, unauthorized access to the custom tab 275 and data in the contents of the custom tab 275 is prevented. In some embodiments, even though the rendered view 280 is not accessible by the current user, the rendered view 280 is still updated in real time and/or periodically for subsequent visual presentation to an authorized user. In some embodiments, the described data security feature ensures that only authorized users matching the user permission may see a custom tab and access to data presented in the custom tab, whereas unauthorized users are not able to see the custom tab and therefore are prevented from accessing the data presented in the custom tab. In at least one embodiment, the features and/or advantages described with respect to the custom tab 275 are applicable to other custom tabs, e.g., 271-274, 276 of the user interface 200.

In some embodiments, a fully automated system is provide while providing a user with the capability and/or flexibility to create, hide and delete one or more custom tabs. Specifically, the user interface is configured to permit the user to create, hide, delete and define user permission for each custom tab. In accordance with one or more features of a custom tab configuration in some embodiments, a user may create his/her own custom tab based on site types, the user may select a view for a site manager application (e.g., as created in a view builder application) and user permission for the site manager application (e.g., created in a product management application), the user may hide and/or delete a custom tab, and efforts to define tabs for changing or dynamic business requirements may be reduced. In some embodiments, a process for user interface customization comprises creating a custom tab for a site type, defining a view and user permission correspondingly from a view builder and a product management, selecting the view and user permission (optional if required) and saving the selected view and user permission, and automatically rendering the custom tab and the associated view (provided that the current user matches the user permission defined for the custom tab or the custom tab is created with default user permission).

FIG. 3 is a schematic diagram of a portion of a database 300 for storing tab information, in accordance with some embodiments. In some embodiments, the database 300 comprises at least one among the one or more databases 130.

Tab information is stored in the database in one or more of a plurality of columns 301-306. The number of columns in the database 300 in FIG. 3 is just an example. The column 301 includes site IDs of a plurality of sites managed by the site manager 120. Each site ID in the column 301 corresponds to a user interface of the corresponding site. For example, the site ID 0001 corresponds to a user interface that visually presents information regarding the site having the site ID 0001, the site ID 0002 corresponds to a user interface that visually presents information regarding the site having the site ID 0002, or the like. In at least one embodiment, each of the user interface corresponding to a particular site, or site ID, has a configuration similar to the user interface 200.

The column 302 includes pages names or tab names, and the column 303 includes page types or tab types, of pages or tabs in the corresponding user interface of a particular site. For example, the user interface of the site having the site ID 0001 has system tabs with names Overview, Workorder, and custom tabs with names Custom 1, Custom 2. The user interface of the site having the site ID 0002 has system tabs with names Overview, Workorder, and a custom tab with a name Custom 3.

For each custom tab, the column 304 includes a View Name or View ID of a view and the column 305 includes user permission associated with the custom tab. For example, in the user interface of the site having the site ID 0001, the custom tabs with names Custom 1, Custom 2 are correspondingly associated with View 1, View 2. In the user interface of the site having the site ID 0002, the custom tab Custom 3 is associated with View 3. The user permission associated with View 1 and custom tab Custom 1 includes the Default User, User 1, and User 2. The user permission associated with View 2 and custom tab Custom 2 includes the Default User. The user permission associated with View 3 and custom tab Custom 3 includes the Default User, and User 3. The Default User of each custom tab corresponds to the respective custom tab owner. When the custom tabs are created or modified by different custom tab owners, it is possible that the Default User of one custom tab indicates a different user or users from the Default User of another custom tab. In the example configuration in FIG. 3, the Default User, User 1, User 2, User 3 include user IDs of various users. However, other types of permission information and/or user information are within the scopes of various embodiments, as described herein. In the example configuration in FIG. 3, the system tabs are not associated with a particular view or user permission. However, configurations are within the scopes of various embodiments. The column 306 representatively indicates one or more further configurations, setting, parameters, information of each page or tab in the corresponding user interface.

For each custom tab, the name, associated view and associated user permission, input in the corresponding input areas 262, 264, 266 when the custom tab is created or modified, are stored in the corresponding columns 302, 304, 305 of the database 300 in association with the Site ID of a particular site, i.e., in association with the user interface that includes the custom tab. The view name and/or view ID in the column 304 are examples of view information which serves a key for retrieving a view configuration of the corresponding view from one or more databases managed by the view builder 144. The retrieved view configuration is usable to render the corresponding view and to fetch data of fields in the rendered view from corresponding resources. The permission information stored in the column 305 indicates user permission to determine whether a current user is authorized to access the corresponding custom tab. The tab name in the column 302 is displayed in the user interface when the current user is determined as being authorized to access the corresponding custom tab.

Figure 4:
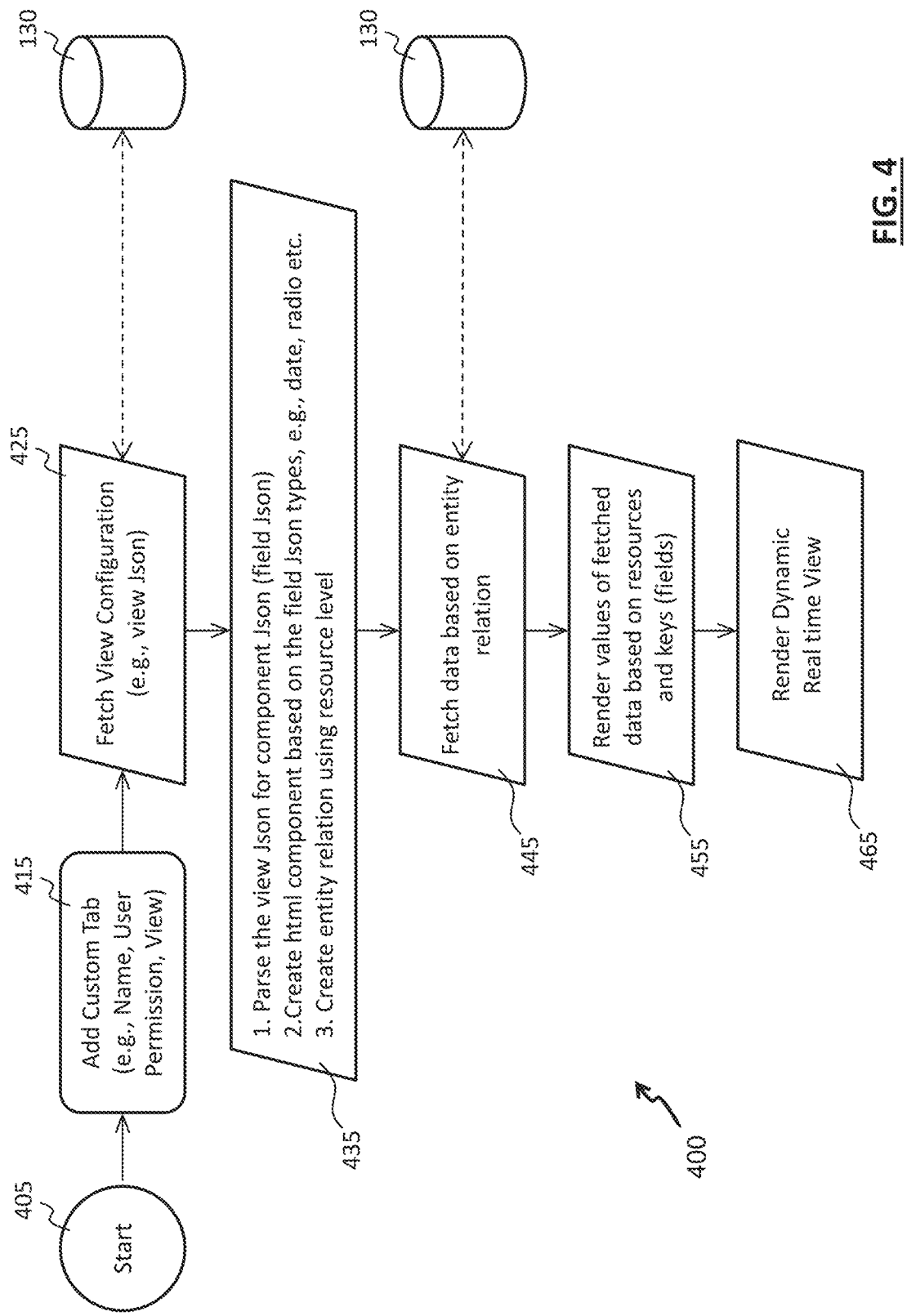
FIGS. 4-6 are flow charts of various processes, in accordance with some embodiments.

FIG. 4 is a flow chart of a process 400, in accordance with some embodiments. In some embodiments, the process 400 is executed by at least one processor at the site manager 120 to add or modify a custom tab in a user interface, for example, as described with respect to FIGS. 2A-2D and 3.

At operation 405, the process 400 is started. For example, operation 405 includes one or more user operations as described with respect to FIGS. 2A-2B to cause a screen 260 to be displayed as shown in FIG. 2C.

As operation 415, information for a custom tab including a name of the custom tab, a view associated with the custom tab, and user permission associated with the custom tab is input, for example, through the corresponding input areas 262, 264, 266 in FIG. 2C. The input name of the custom tab, view information of the associated view, and permission information of the associated user permission are stored in a database 300 and in association with the user interface 200, for example, as described with respect to FIG. 3.

At operation 425, a view configuration of the view associated with the custom tab is fetched from the one or more databases 130. In an example, the view information, e.g., view name or view ID stored in the database 300 is used as a key to search for the associated view among a plurality of views in the one or more databases 130. In at least one embodiment, the plurality of views are created and/or managed by the view builder 144 in a database 134 as described with respect to FIG. 1. When the associated view corresponding to the stored view information is located, the view configuration of the associated view is retrieved and fetched to the site manager 120. In some embodiments, the view configuration includes a JSON configuration as described herein.

At operation 435, various actions are performed based on the retrieved view configuration. For example, with the retrieved view configuration being a JSON configuration, the JSON configuration is parsed to determine component JSON (or field JSON). Hyper Text Markup Language (HTML) components based on the field JSON types, e.g., date, radio, etc., in the parsed JSON configuration are determined. The determined HTML components correspond to various fields of the associated view to be rendered. The resources where data of the fields are retrievable are included in the view configuration and/or determinable by using the fields as keys to look for corresponding keys (e.g., corresponding fields) in one or more tables and/or databases in the one or more databases 130. The relationship between each field in the associated view and a corresponding resource for retrieving data from is created, and referred to as entity relation at resource level.

At operation 445, the created entity relation is used for fetching data of the fields from the corresponding resources. In at least one embodiment, data of the fields are fetched from a database 132, as described with respect to FIG. 1.

At operation 455, values of the fetched data are rendered in the associated view based on the corresponding resources and the corresponding fields. For example, the fetched data and the corresponding HTML components (i.e., keys or fields) are rendered as an HTML page. The rendered view, i.e., the HTML page, is visually presented in the user interface to the custom tab owner, for example, as described with respect to FIG. 2D.

At operation 465, the rendered view is dynamically presented or updated in real time and/or periodically, as described herein. The described specifics of JSON and HTML are examples. Other software platforms and/or formats are within the scopes of various embodiments. In at least one embodiment, one or more advantages described with respect to FIGS. 1-3 are achievable by the process 400.

Figure 5:
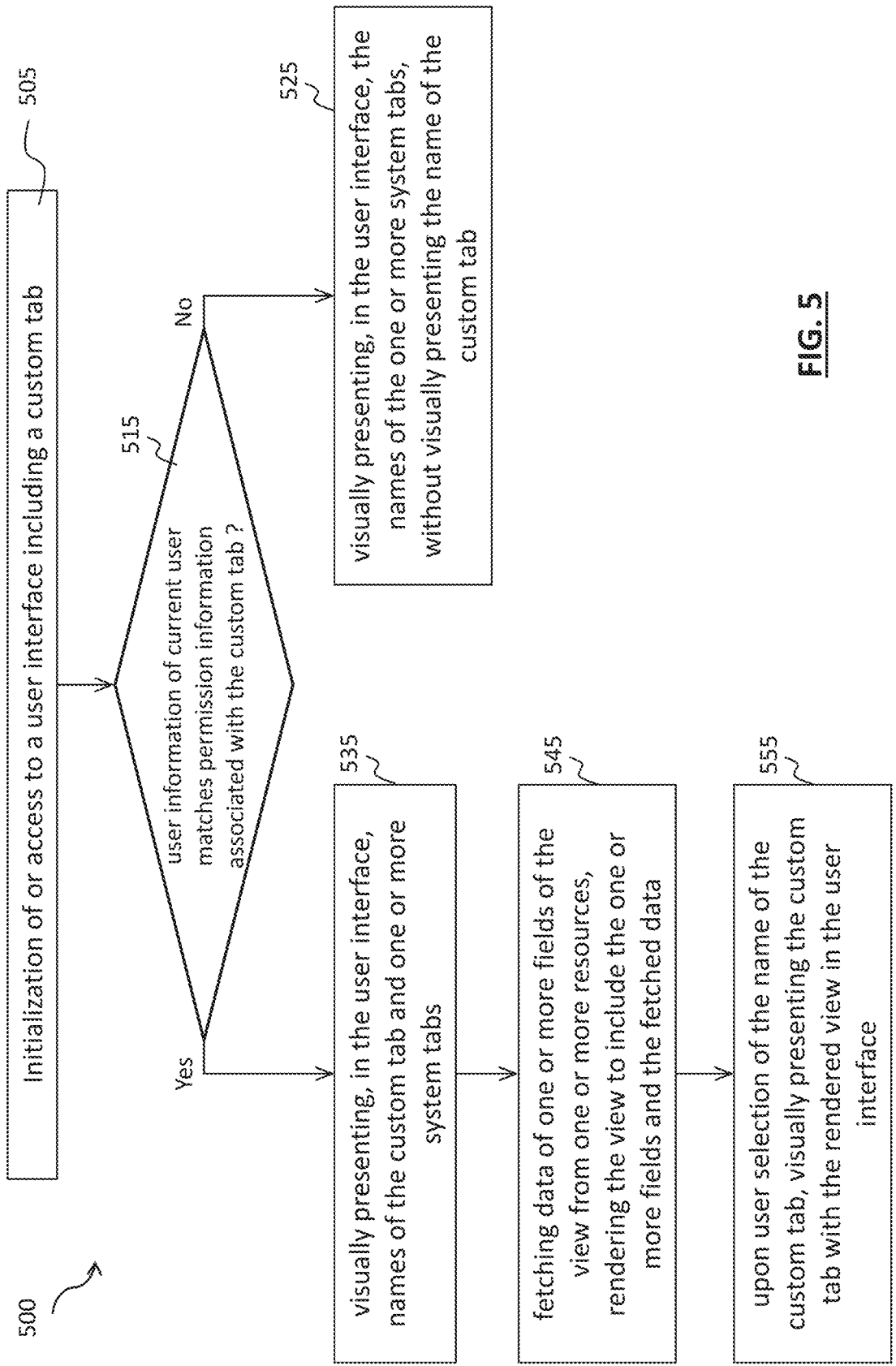

FIG. 5 is a flow chart of a process 500, in accordance with some embodiments. In some embodiments, the process 500 is executed by at least one processor at the site manager 120 to selectively display a custom tab that has been previously added or modified, depending on the user permission associated with the custom tab and the current user of the user interface.

At operation 505, a user interface including a custom tab and one or more system tabs is initialized or accessed. The custom tab is associated with a view and user permission defined by a custom tab owner. For example, as described with respect to FIGS. 2A, 2D, the user interface 200 includes a custom tab 275 and system tabs 220-229. The custom tab is associated with a view and user permission defined by a custom tab owner and stored in a database, as described with respect to FIGS. 2C, 3.

At operation 515, it is determined whether user information of a current user of the user interface matches permission information corresponding to the user permission associated with the custom tab. For example, the permission information of the custom tab is read from the corresponding column 305 of the database 300, and is checked against the user information (e.g., user ID) of the current user. In response to the user information of the current user of the user interface not matching the permission information (No at operation 515), the process proceeds to operation 525; otherwise (Yes at operation 515), the process proceeds to operation 535.

At operation 525 (from No at operation 515), the names of the one or more system tabs are visually presented in the user interface, without visually presenting the name of the custom tab. For example, in the user interface 200, the names of the system tabs 220-229 are displayed but the name of the custom tab 275 is hidden. As a result, the current user, who was determined as a unauthorized user with the user information not matching the permission information, may not see the custom tab and is prevented from view the custom tab and/or accessing data therein.

At operation 535 (from Yes at operation 515), the names of the one or more system tabs and the name of the custom tab are visually presented in the user interface. For example, in the user interface 200, the names of the system tabs 220-229 and the name of the custom tab 275 are all displayed. As a result, the current user, who was determined as an authorized user with the user information matching the permission information, is permitted to view the custom tab and/or access data therein.

At operation 545, data of one or more fields of the associated view are fetched from one or more resources, and the associated view is rendered to include the one or more fields and the fetched data. For example, data are fetched and the associated view is rendered as described with respect to FIG. 4, at operations 425-455.

At operation 555, upon user selection of the name of the custom tab, the custom tab is visually presented with the rendered view in the user interface, for example, as exemplarily illustrated in FIG. 2D. In some embodiments, the associated view is rendered before the user selects the custom tab for viewing. As a result, when the user selects the custom tab, the rendered view is ready to be displayed to the user, in a timely and/or intuitive manner. In at least one embodiment, one or more advantages described with respect to FIGS. 1-4 are achievable by the process 500.

Figure 6:
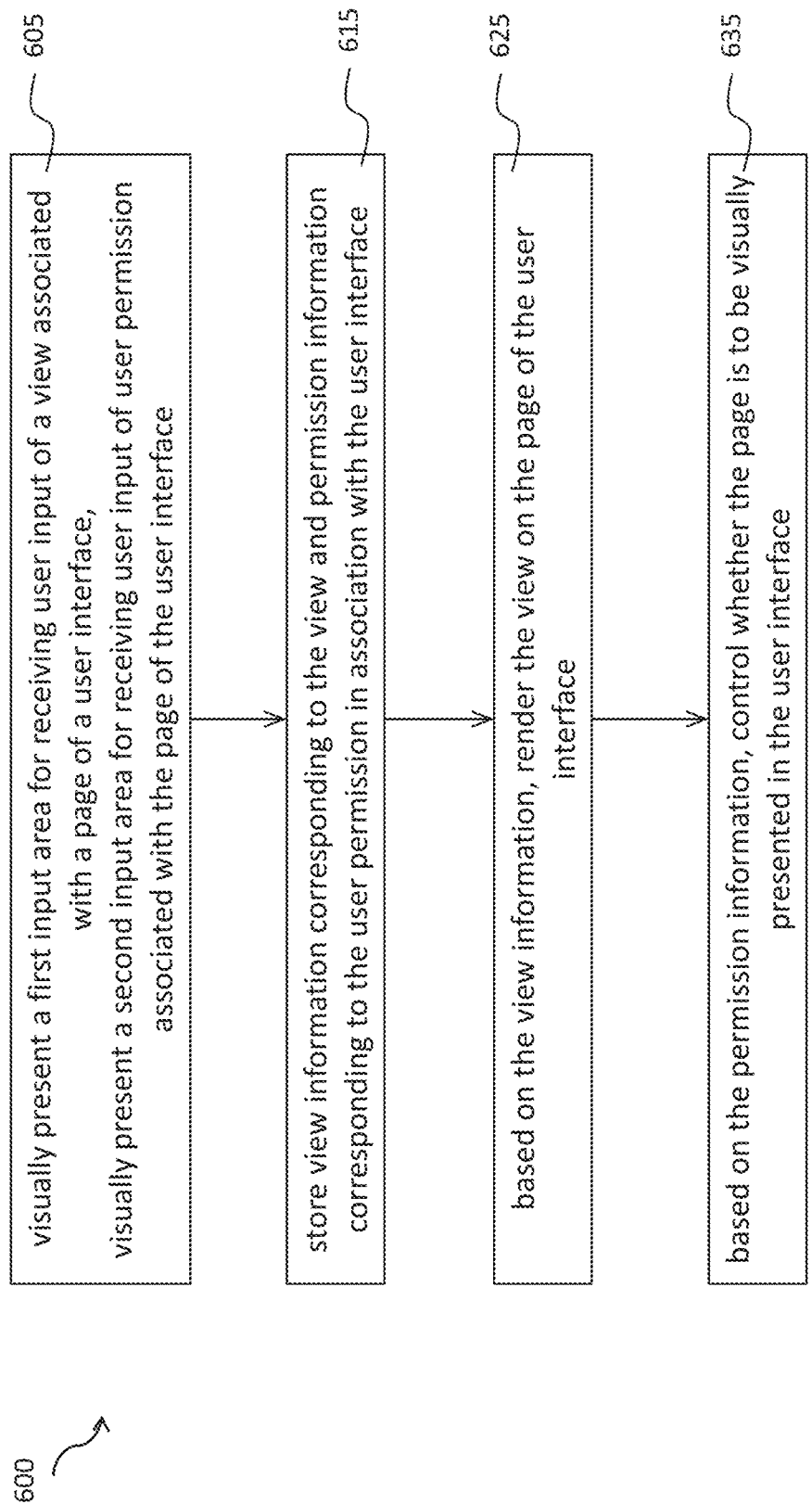

FIG. 6 is a flow chart of a process 600, in accordance with some embodiments. In some embodiments, the process 600 is executed by at least one processor at the site manager 120 to perform one or more operations and/or functions described herein.

At operation 605, a first input area and a second input area are visually presented for receiving user input correspondingly of a view associated with a page of a user interface, and user permission associated with the page of the user interface. In some embodiments, an example of the page is a custom tab. For example, input areas 264, 266 are visually presented for receiving user input correspondingly of an associated view and associated user permission, as described with respect to FIG. 2C.

At operation 615, view information corresponding to the associated view and permission information corresponding to the user permission are stored in association with the user interface. For example, as described with respect to FIG. 3, view information corresponding to the associated view is stored in column 304 and permission information corresponding to the user permission is stored in column 305, in association with the user interface corresponding to the Site ID in column 301.

At operation 625, based on the view information, the associated view is rendered on the page of the user interface, for example, as described with respect to FIG. 4, at operations 425-455.

At operation 635, based on the permission information, the at least one processor controls whether the page is to be visually presented in the user interface or not, for example, as described with respect to FIG. 5, at operations 515-535. In at least one embodiment, one or more advantages described with respect to FIGS. 1-5 are achievable by the process 600.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 7:
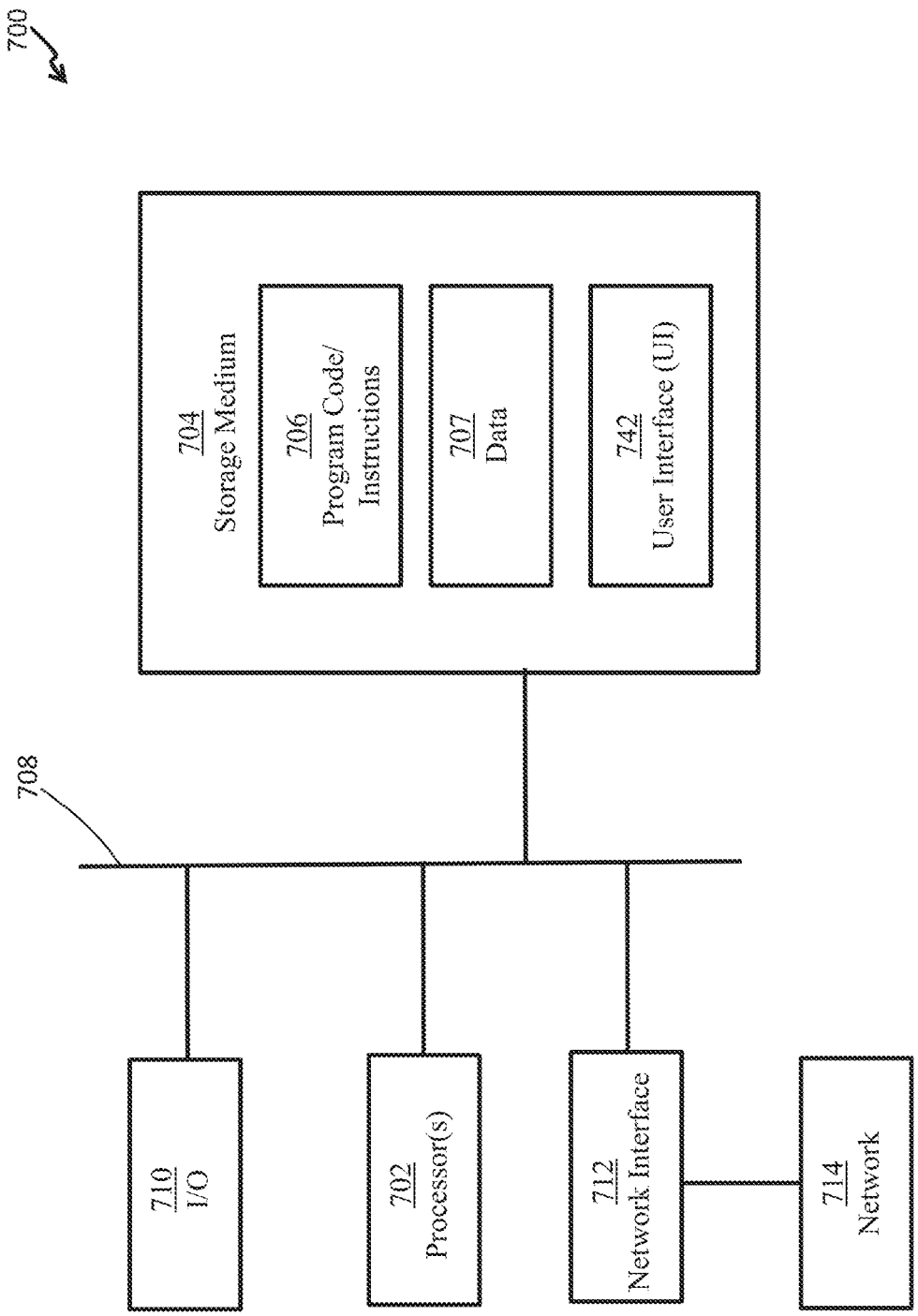
FIG. 7 is a schematic block diagram of a computer system, in accordance with some embodiments.

FIG. 7 is a schematic block diagram of a computer system 700, in accordance with some embodiments. Examples of the computer system 700 include, but are not limited to, desktop, a laptop, a tablet, a smart phone, a server, or the like.

The computer system 700 includes a hardware processor 702 and a non-transitory, computer-readable storage medium 704. Storage medium 704, amongst other things, is encoded with, i.e., stores, computer program code 706, i.e., a set of executable instructions, such as one or more algorithms, programs, applications, sets of executable instructions for a view builder, or the like, as described with respect to one or more of FIGS. 1-8. Execution of instructions 706 by hardware processor 702 implements a portion or all of the methods described herein in accordance with one or more embodiments (hereinafter, the noted processes and/or methods).

Processor 702 is coupled to non-transitory computer-readable storage medium 704 via a bus 708. Processor 702 is also coupled to an I/O interface 710 by bus 708. A network interface 712 is connected to processor 702 via bus 708. Network interface 712 is connected to a network 714, so that processor 702 and computer-readable storage medium 704 are connectable to external elements or devices via network 714. Processor 702 is configured to execute computer program code 706 encoded in computer-readable storage medium 704 in order to cause computer system 700 to be usable for performing a portion or all of the noted processes and/or methods. In one or more embodiments, processor 702 comprises a central processing unit (CPU), a multi-processor, a distributed processing system, an application specific integrated circuit (ASIC), and/or a suitable hardware processing unit.

In one or more embodiments, computer-readable storage medium 704 comprises an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause computer system 700 to be usable for performing a portion or all of the noted processes and/or methods. In one or more embodiments, storage medium 704 also stores information or data 707, such as event data, consumer data, business data, policies, component configurations or the like, used in a portion or all of the noted processes and/or methods.

I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702. Computer system 700 is configured to receive information through I/O interface 710. The information received through I/O interface 710 includes one or more of instructions, data, policies, configurations and/or other parameters for processing by processor 702. The information is transferred to processor 702 via bus 708. Computer system 700 is configured to receive information related to a user interface through I/O interface 710. The information is stored in computer-readable storage medium 704 as user interface (UI) 742.

Network interface 712 allows computer system 700 to communicate with network 714, to which one or more other computer systems are connected. Network interface 712 includes wireless network interfaces such as BLUETOOTH, WIFI, WIMAX, GPRS, LTE, 7G, 6G, WCDMA, or the like; or wired network interfaces such as ETHERNET, USB, IEEE-864 or the like. In one or more embodiments, a portion or all of noted processes and/or methods, is implemented in two or more computer system 700.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A system for user interface customization, the system comprising:

at least one processor; and at least one computer readable storage medium coupled to the at least one processor and configured to store executable instructions that, when executed by the at least one processor, cause the at least one processor to visually present a first input area for receiving user input of a view associated with a page of a user interface, visually present a second input area for receiving user input of user permission associated with the page of the user interface, store view information corresponding to the view and permission information corresponding to the user permission in association with the user interface, wherein the view is defined by a view configuration comprising information regarding one or more fields, and one or more resources corresponding to the one or more fields, wherein the view configuration comprises a JavaScript Object Notation (JSON) configuration of the view, based on the view configuration, determine one or more resources corresponding one or more fields in the view by parsing the JSON configuration of the view, wherein the one or more fields includes an identifier of a site of a network device of a cellular network, fetch data of the one or more fields from the corresponding one or more resources using one or more entity relations between the one or more fields and the site of the network device of the cellular network, wherein the one or more entity relations between the one or more fields in the view and the site of the network device of the cellular network is created based on the parsed JSON configuration, based on the view information, render the view on the page of the user interface to include the one or more fields and the fetched data of the one or more fields, and based on the permission information, control whether the page is to be visually presented in the user interface.

2. The system of claim 1, wherein the executable instructions, when executed by the at least one processor, further cause the at least one processor to in response to user information of a current user of the user interface matching the permission information, permit the page with the rendered view to be visually presented in the user interface, and in response to the user information of the current user of the user interface not matching the permission information, prevent the page from being visually presented in the user interface.

3. The system of claim 2, wherein
the executable instructions, when executed by the at least one processor, further cause the at least one processor to,
  in response to the second input area being left blank, store, as the permission information, default permission information corresponding to a user who created or modified the page.

4. The system of claim 1, wherein
the page has a page name, and
the executable instructions, when executed by the at least one processor, further cause the at least one processor to
  in response to user information of a current user of the user interface not matching the permission information, prevent the page name from being visually presented in the user interface.

5. The system of claim 4, wherein
the executable instructions, when executed by the at least one processor, further cause the at least one processor to
  visually present, together with the first input area and the second input area, a third input area for receiving user input of the page name of the page.

6. The system of claim 1, wherein
the user interface comprises a plurality of tabs,
the page is a custom tab among the plurality of tabs,
the custom tab is modifiable, hidable, and deletable, and
the plurality of tabs further comprises one or more system tabs which are neither modifiable, hidable, nor deletable.

7. The system of claim 6, wherein
the executable instructions, when executed by the at least one processor, further cause the at least one processor to,
  in response to user information of a current user of the user interface matching the permission information, visually present, in the user interface, names of the custom tab and the one or more system tabs, and
  in response to the user information of the current user of the user interface not matching the permission information, visually present, in the user interface, the names of the one or more system tabs, without visually presenting the name of the custom tab.

8. The system of claim 6, wherein
the executable instructions, when executed by the at least one processor, further cause the at least one processor to
  in response to user selection of a first item on the user interface, visually present a list of the plurality of tabs, and
  in response to user operation on the list, rearrange an order of the plurality of tabs in the list.

9. The system of claim 8, wherein
the executable instructions, when executed by the at least one processor, further cause the at least one processor to
  in response to user selection of a second item on the user interface, visually present the first input area and the second input area for modifying or adding the custom tab.

10. A method of user interface customization, said method performed at least in part by at least one processor, said method comprising adding or modifying a custom tab in a user interface, wherein said adding or modifying the custom tab comprises:
  visually presenting first, second and third input areas for receiving user input correspondingly of
    a view associated with the custom tab,
    user permission associated with the custom tab, and
    a name of the custom tab;
  fetching a view configuration corresponding to the view from at least one database, wherein the view configuration comprises a JavaScript Object Notation (JSON) configuration of the view;
  based on the fetched view configuration, determining one or more resources corresponding one or more fields in the view by parsing the JSON configuration of the view, wherein the one or more fields includes an identifier of a site of a network device of a cellular network;
  fetching data of the one or more fields from the corresponding one or more resources using one or more entity relations between the one or more fields and the site of the network device of the cellular network, wherein the one or more entity relations between the one or more fields in the view and the site of the network device of the cellular network is created based on the parsed JSON configuration;
  rendering the view to include the one or more fields and the fetched data of the one or more fields; and
  visually presenting the custom tab with the rendered view in the user interface.

11. The method of claim 10, further comprising, after said adding or modifying the custom tab,
  determining whether user information of a current user of the user interface matches permission information corresponding to the user permission associated with the custom tab;
  in response to the user information of the current user of the user interface matching the permission information,
    visually presenting the name of the custom tab in the user interface, and
    upon user selection of the name of the custom tab, visually presenting the custom tab with the rendered view in the user interface; and
  in response to the user information of the current user of the user interface not matching the permission information, preventing the name of the custom tab from being visually presented in the user interface.

12. The method of claim 11, wherein
said determining whether the user information of the current user of the user interface matches the permission information corresponding to the user permission associated with the custom tab is performed upon initialization of or access to the user interface.

13. The method of claim 10, further comprising:
  based on the parsed JSON configuration, creating one or more Hyper Text Markup Language (HTML) components corresponding to the one or more fields of the view,
  wherein said rendering comprises rendering the view as or on an HTML page.

14. The method of claim 10, wherein
the first input area for receiving user input of the view associated with the custom tab comprises a searchable input area, and
the method further comprises:
  searching, among a plurality of views, for one or more views matching the user input, and visually presenting the one or more views for user selection of the view associated with the custom tab.

15. The method of claim 10, wherein
in response to the second input area being left blank and after said adding or modifying the custom tab,
the custom tab with the rendered view is only visually presented in the user interface in response to user information of a current user of the user interface matches default permission information corresponding to a user who created or modified the custom tab.

16. The method of claim 10, further comprising:
updating, in real time or periodically, data of the one or more fields in the rendered view.

17. The method of claim 10, wherein
the user interface comprises a plurality of tabs including the custom tab, and one or more system tabs,
the custom tab is modifiable, hidable, and deletable, and
the one or more system tabs are neither modifiable, hidable, nor deletable,
the method further comprising:
in response to user information of a current user of the user interface matching permission information corresponding to the user permission associated with the custom tab,
visually presenting, in the user interface, the name of the custom tab and names of the one or more system tabs, and
upon user selection of the name of the custom tab, visually presenting the custom tab with the rendered view in the user interface; and
in response to the user information of the current user of the user interface not matching the permission information,
visually presenting, in the user interface, the names of the one or more system tabs, without visually presenting the name of the custom tab.

18. A computer program product, comprising a non-transitory, tangible computer readable storage medium storing a computer program that, when executed by at least one processor, causes the at least one processor to perform upon initialization of or access to a user interface including a custom tab and one or more system tabs, the custom tab associated with a view and user permission, determining whether user information of a current user of the user interface matches permission information corresponding to the user permission associated with the custom tab,
in response to the user information of the current user of the user interface matching the permission information,
visually presenting, in the user interface, names of the custom tab and the one or more system tabs,
fetching a view configuration corresponding to the view from at least one database, wherein the view configuration comprises a JavaScript Object Notation (JSON) configuration of the view,
based on the fetched view configuration, determining one or more resources corresponding one or more fields in the view by parsing the JSON configuration of the view, wherein the one or more fields includes an identifier of a site of a network device of a cellular network,
fetching data of one or more fields of the view from one or more resources using one or more entity relations between the one or more fields and the site of the network device of the cellular network, wherein the one or more entity relations between the one or more fields in the view and the site of the network device of the cellular network is created based on the parsed JSON configuration,
rendering the view to include the one or more fields and the fetched data of the one or more fields, and
upon user selection of the name of the custom tab, visually presenting the custom tab with the rendered view in the user interface; and
in response to the user information of the current user of the user interface not matching the permission information,
visually presenting, in the user interface, the names of the one or more system tabs, without visually presenting the name of the custom tab.

* * * * *